(12) United States Patent
Mikasa et al.

(10) Patent No.: US 12,202,388 B2
(45) Date of Patent: Jan. 21, 2025

(54) CLUTCH UNIT

(71) Applicant: NTN Corporation, Osaka (JP)

(72) Inventors: Kunihiro Mikasa, Kanagawa (JP); Yu Kitada, Kanagawa (JP); Kyohei Sasanuma, Shizuoka (JP); Shaoluan Bian, Shizuoka (JP)

(73) Assignee: NTN CORPORATION, Osaka (JP)

( * ) Notice: Subject to any disclaimer, the term of this patent is extended or adjusted under 35 U.S.C. 154(b) by 301 days.

(21) Appl. No.: 17/921,730

(22) PCT Filed: May 6, 2021

(86) PCT No.: PCT/JP2021/017378
§ 371 (c)(1),
(2) Date: Oct. 27, 2022

(87) PCT Pub. No.: WO2021/225138
PCT Pub. Date: Nov. 11, 2021

(65) Prior Publication Data
US 2023/0166642 A1  Jun. 1, 2023

(30) Foreign Application Priority Data
May 7, 2020 (JP) .................................. 2020-082175

(51) Int. Cl.
*B60N 2/16* (2006.01)
*B60N 2/90* (2018.01)
(Continued)

(52) U.S. Cl.
CPC ............... *B60N 2/16* (2013.01); *B60N 2/933* (2018.02); *F16D 15/00* (2013.01); *F16D 43/02* (2013.01)

(58) Field of Classification Search
CPC .......... B60N 2/16; B60N 2/933; B60N 2/167; B60N 2/168; B60N 2/1615; F16D 15/00;
(Continued)

(56) References Cited

U.S. PATENT DOCUMENTS 9,163,686 B2 * 10/2015 Kawai .................... F16D 67/02
9,469,219 B2    10/2016 Kim
(Continued)

FOREIGN PATENT DOCUMENTS

CN        107539171        1/2018
JP        2004-197846      7/2004
(Continued)

OTHER PUBLICATIONS

International Preliminary Report on Patentability and Written Opinion of the International Searching Authority dated Nov. 8, 2022 in International (PCT) Application No. PCT/JP2021/017378.
(Continued)

*Primary Examiner* — Jacob S. Scott
*Assistant Examiner* — Farhana Pervin
(74) *Attorney, Agent, or Firm* — Wenderoth, Lind & Ponack, L.L.P

(57) ABSTRACT

A clutch unit includes an operation lever, an operation bracket, an output shaft member, an input-side clutch, an output-side clutch, and a housing. An input-side outer ring member of the input-side clutch is a member including a bottom part and an outer ring part. A part of the outer ring part is a thick part. The thickness of the thick part in the radial direction is larger than the thickness of a non-thick part in the radial direction.

11 Claims, 4 Drawing Sheets

(51) Int. Cl.
*F16D 15/00* (2006.01)
*F16D 43/02* (2006.01)

(58) Field of Classification Search
CPC .................. F16D 43/02; F16D 41/105; F16D 2041/0608
See application file for complete search history.

(56) References Cited

U.S. PATENT DOCUMENTS

| | | |
|---|---|---|
| 2012/0112508 A1 | 5/2012 | Richard et al. |
| 2018/0001794 A1 | 1/2018 | Kim et al. |
| 2018/0099585 A1* | 4/2018 | Mikasa .................. B60N 2/943 |
| 2018/0345826 A1* | 12/2018 | Mikasa ................ B60N 2/1615 |

FOREIGN PATENT DOCUMENTS

| | | |
|---|---|---|
| JP | 2012-052625 | 3/2012 |
| JP | 2012-101786 | 5/2012 |
| JP | 2020-046018 | 3/2020 |
| KR | 10-2008-0017959 | 2/2008 |

OTHER PUBLICATIONS

International Search Report issued Jul. 13, 2021, in International (PCT) Application No. PCT/JP2021/017378, with English translation.

* cited by examiner

CLUTCH UNIT

TECHNICAL FIELD

The present invention relates to a clutch unit.

BACKGROUND ART

A clutch unit is known from Patent Literature 1 and other documents.

CITATIONS LIST

Patent Literature

Patent Literature 1: JP 2012-101786 A

SUMMARY OF INVENTION

Technical Problems

In a state where a vehicle seat is fully raised (uppermost) or fully lowered (downmost), an operation of raising or lowering the vehicle seat of the output-side clutch is locked. If an operation handle is operated in the rotation direction in which the operation of the output-side clutch is locked, an excessive load is applied, which may break or deform components.

An object of the present invention is to provide a clutch unit that can curb breakage and deformation of components even when an excessive load is applied in a state where an output-side clutch is locked.

Solutions to Problems

A clutch unit according to the present invention that can solve the above problem is
  a clutch unit used for a vehicle seat, the clutch unit including:
  an operation lever that is rotatable about a rotation axis;
  an operation member that rotates integrally with the operation lever about the rotation axis;
  an output shaft member that is rotatable about the rotation axis and outputs an operation force input to the operation lever to the vehicle seat;
  an input-side clutch including an input-side inner ring member and an input-side outer ring member into which the output shaft member is inserted, and an input-side transmission member disposed in a wedge-shaped space formed between an outer peripheral surface of the input-side inner ring member and an inner peripheral surface of the input-side outer ring member;
  an output-side clutch that transmits rotational torque of the input-side clutch to the output shaft member and curbs transmission of rotational torque from the output shaft member to the input-side clutch; and
  a housing that accommodates the input-side clutch, wherein:
  the input-side outer ring member is a member including a disk-shaped bottom part and an outer ring part extending in a rotation axis direction from an outer edge part of the bottom part;
  a part of the outer ring part of the input-side outer ring member is a thick part projecting outward in a radial direction of the input-side outer ring member; and
  a thickness of the thick part in the radial direction is larger than a thickness of a non-thick part in the radial direction, the non-thick part being a part of the outer ring part other than the thick part.

Advantageous Effects of Invention

According to the present invention, it is possible to provide a clutch unit that can curb breakage and deformation of components even when an excessive load is applied in a state where an output-side clutch is locked.

DESCRIPTION OF EMBODIMENT

Hereinafter, an example of an embodiment of a clutch unit according to the present invention will be described with reference to the drawings.

Figure 1:
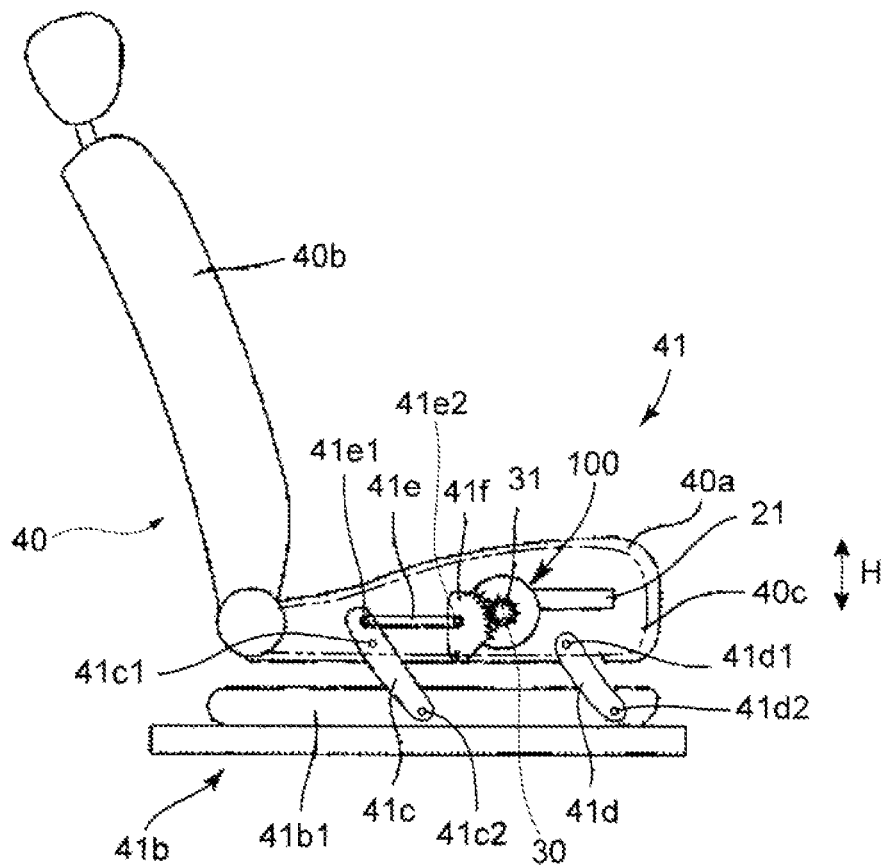
FIG. 1 is a side view illustrating a state where a clutch unit according to the present embodiment is applied to a vehicle seat lifter.

FIG. 1 is a side view illustrating a state where the clutch unit according to the present embodiment is applied to a vehicle seat lifter. As illustrated in FIG. 1, a clutch unit 100 according to the present embodiment is used for a vehicle seat 40. The vehicle seat 40 includes a seat 40a, a backrest 40b, and a seat frame 40c. The clutch unit 100 is fixed to the seat frame 40c of the seat 40a. A vehicle seat lifter 41 is mounted on the vehicle seat 40. The vehicle seat lifter 41 includes the clutch unit 100.

The vehicle seat lifter 41 includes a sector gear 41f and a link mechanism. The clutch unit 100 includes an operation lever 21 that is rotationally operated forward and backward. A pinion gear 31 integrated with an output shaft member 30 rotated forward and backward by the operation lever 21 meshes with the sector gear 41f of the vehicle seat lifter 41.

The link mechanism includes a first link member 41c extending substantially in the vertical direction, a second link member 41d extending substantially in the vertical direction, and a third link member 41e extending substantially in the lateral direction.

An upper part of the first link member 41c and an upper part of the second link member 41d are rotatably connected to the seat frame 40c by shaft members 41cl and 41dl, respectively. A lower part of the first link member 41c and a lower part of the second link member 41d are rotatably connected to a slidable member 41bl of a seat slide adjuster 41b by shaft members 41c2 and 41d2, respectively.

One end of the third link member 41e is connected to the first link member 41c by a shaft member 41el above the shaft member 41cl. The other end of the third link member 41e is rotatably connected to the sector gear 41f by a shaft member 41e2.

In FIG. 1, when the operation lever 21 is rotated counterclockwise (upward), the input torque (rotational force) in the rotational direction is transmitted to the pinion gear 31, and the pinion gear 31 rotates counterclockwise. Then, the sector gear 41f meshing with the pinion gear 31 rotates clockwise, and the third link member 41e pulls the upper part of the first link member 41c upward. As a result, the first link member 41c and the second link member 41d stand together, and the seat surface of the seat 40a is raised. After a height H of the seat 40a is adjusted, when the force input to the operation lever 21 is released, the operation lever 21 rotates clockwise and returns to the original position (referred to as neutral position or neutral state in following description).

When the operation lever 21 is rotated clockwise (downward), the seat surface of the seat 40a is lowered by an operation counter to the above. When the operation lever 21 is released after the height adjustment, the operation lever 21 rotates counterclockwise and returns to the original position (neutral position, neutral state).

Then, in a state where the operation lever 21 is released, the clutch unit 100 brakes the rotation of the output shaft member 30 (pinion gear 31). Therefore, even when a force in the vertical direction is applied to the seat 40a, movement of the seat 40a in the vertical direction is prevented.

<Clutch Unit>

Next, the clutch unit 100 according to the present embodiment will be described. Components of the clutch unit 100 described below are basically made of metal unless otherwise specified.

Figure 2:
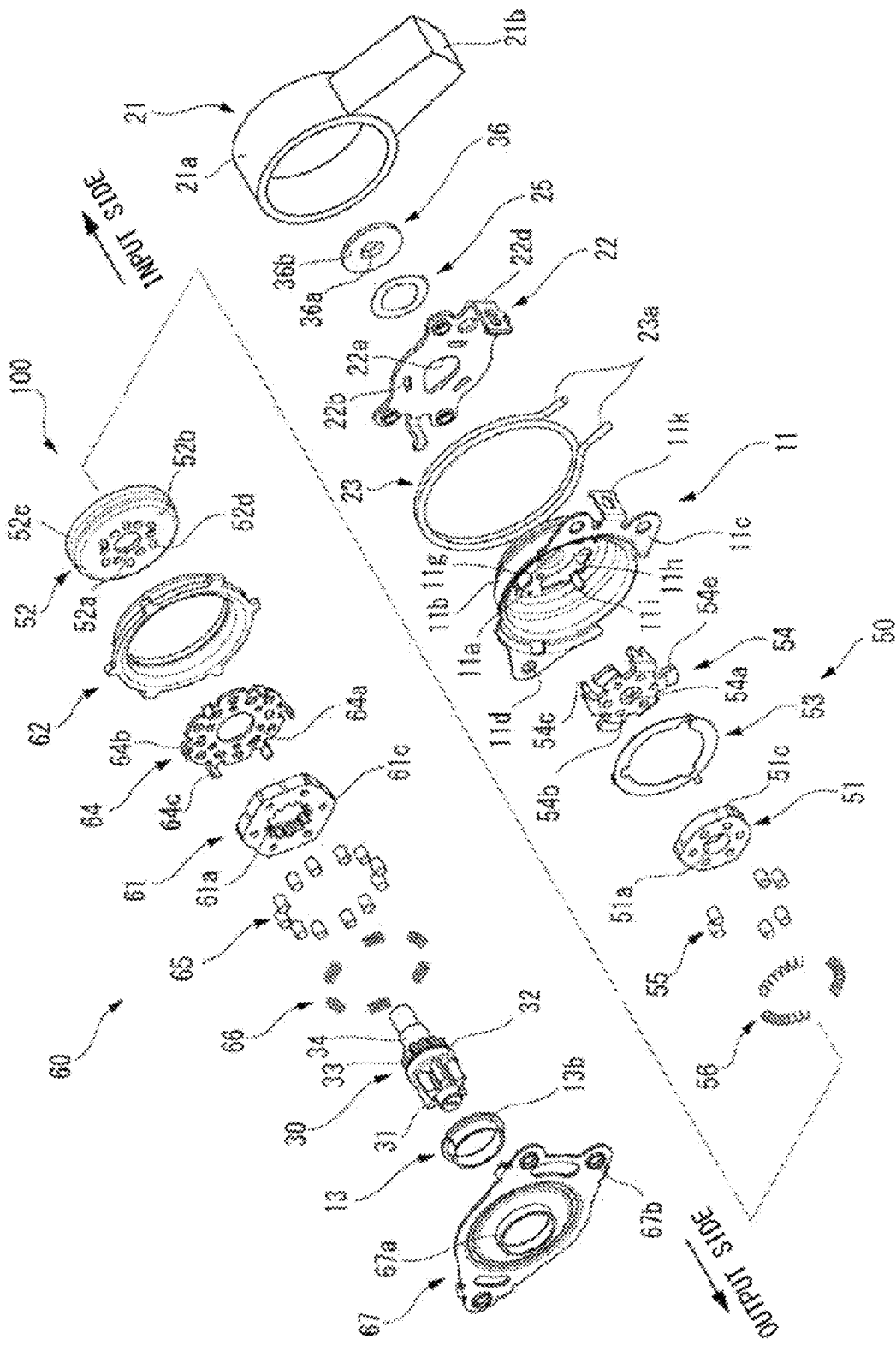
FIG. 2 is an exploded perspective view of the clutch unit.

FIG. 2 is an exploded perspective view of the clutch unit 100. As illustrated in FIG. 2, the clutch unit 100 includes the operation lever 21, the output shaft member 30, an input-side clutch 50, an output-side clutch 60, a housing 11, and a fixing member 67.

The input-side clutch 50 is driven (actuated) by the operation lever 21 to transmit the rotation of the operation lever 21 to the output shaft member 30. The output-side clutch 60 prevents rotation of the output shaft member 30 even when a force in the vertical direction is applied to the seat 40a. The input-side clutch 50 and the output-side clutch 60 are accommodated in the housing 11. The housing 11 is a member that does not rotate when the operation lever 21 is operated.

The output shaft member 30 is a shaft member extending from the lower left to the upper right in FIG. 2. The output shaft member 30 is rotatable about a rotation axis extending from the lower left to the upper right in FIG. 2. In the following description, "rotation axis direction" means the direction in which the output shaft member 30 extends. As illustrated in FIG. 2, the output shaft member 30 penetrates the output-side clutch 60 and the input-side clutch 50 in this order from the left to the right in FIG. 2. In the following description, the lower left side in FIG. 2 may be referred to as an output side, and the upper right side in FIG. 2 may be referred to as an input side. In addition, unless otherwise specified in the following description, the circumferential direction and the radial direction are defined around the rotation axis.

The output shaft member 30 is provided with the pinion gear 31, a large-diameter columnar part 32, a spline part 33, and a small-diameter columnar part 34 in this order from the output side toward the input side.

The pinion gear 31 is provided at an output-side end of the output shaft member 30. The large-diameter columnar part 32 penetrates a metal bush 13 fixed to the fixing member 67 described later. The small-diameter columnar part 34 penetrates an input-side inner ring member 51 and an input-side outer ring member 52 of the input-side clutch 50 described later, and the housing 11. The spline part 33 is spline-coupled to an output-side inner ring member 61 of the output-side clutch 60 described later.

A stopper ring 36 is attached to the small-diameter columnar part 34 of the output shaft member 30. The stopper ring 36 includes a cylindrical fitting part 36a and a disk-shaped flange part 36b located on the output side of the fitting part 36a. The small-diameter columnar part 34 of the output shaft member 30 is fitted into the fitting part 36a. The flange part 36b abuts on a biasing member 25. The biasing member 25 is formed of a wave washer or the like in which spring steel is formed in a ring shape, and has a wave shape in which a plurality of curved parts are alternately formed along the circumferential direction. The biasing member 25 applies a biasing force to an operation plate 22 described later to press the operation plate 22 toward a bottom surface 11a of the housing 11 described later. The flange part 36b prevents the biasing member 25, the operation plate 22, the housing 11, the input-side clutch 50, and the output-side clutch 60 described later from coming off from the output shaft member 30.

The housing 11 is a cup-shaped (bottomed cylindrical) member, and has the bottom surface 11a and a cylindrical part 11b. Two fixing flanges 11c protruding in the radial direction are formed at an output-side end of the cylindrical part 11b. The fixing flange 11c is provided with a fixing bolt insertion hole 11d. The housing 11 is fixed to the seat frame 40c by screwing a bolt (not illustrated) inserted into the fixing bolt insertion hole 11d into a screw hole of the seat frame 40c. Note that the housing 11 may be fixed to the seat frame 40c by providing a rivet part in the housing 11 and riveting the rivet part to the seat frame 40c.

The housing 11 is provided with a spring locking piece llk. The spring locking piece 11k extends to the input side.

A bearing 11g having a cylindrical shape is formed at the center in the radial direction of the bottom surface 11a by burring. The bearing 11g extends from the bottom surface 11a toward the input side. The bearing 11g rotatably supports the output shaft member 30 with respect to the housing 11. Further, three window parts 11h formed of arc-shaped long holes and three protruding pieces 11i extending from the edge part of the window parts 11h toward the output side are formed on the bottom surface 11a.

The operation lever 21 is molded from synthetic resin, for example, and is fixed to the operation plate 22 described later. The operation lever 21 includes a fixing part 21a fixed to the operation plate 22 and a bar-shaped grip part 21b extending radially outward from the fixing part 21a.

The operation plate 22 is provided between the housing 11 and the operation lever 21 in the rotation axis direction. When the operator grips the grip part 21b of the operation lever 21 and rotates the operation lever 21 forward and backward about the rotation axis, the operation plate 22 rotates forward and backward integrally with the operation lever 21.

The operation plate 22 has an insertion hole 22a at the center in the radial direction. The small-diameter columnar part 34 of the output shaft member 30 is inserted into the insertion hole 22a. The operation plate 22 has three rectangular engagement holes 22b around the insertion hole 22a. A claw part 54c of an operation bracket 54 described later is inserted into the engagement hole 22b, and the operation lever 21 rotates together with the operation bracket 54 via the operation plate 22.

An operation piece part 22d is provided on the outer peripheral edge of the operation plate 22. The operation piece part 22d extends toward the output side.

A return spring 23 is provided on the outer periphery of the housing 11. The return spring 23 returns the operation lever 21 and the operation plate 22 to the neutral positions when no operation force is applied to the operation lever 21. The return spring 23 is, for example, a helical spring having an arc shape in which both free ends 23a are brought close to each other. Both free ends 23a of the return spring 23 are locked to the spring locking piece 11k of the housing 11 and the operation piece part 22d of the operation plate 22.

In a state where the operator does not apply an operation force to the operation lever 21 (neutral state), the pair of free ends 23a of the return spring 23 are both in contact with the spring locking piece 11k and the operation piece part 22d, and the operation lever 21 is supported at the neutral position. When the operator rotates the operation lever 21 either forward or backward about the rotation axis, the operation plate 22 rotates with respect to the housing 11 together with the operation lever 21. Then, one free end 23a of the pair of free ends 23a maintains the engagement state with the spring locking piece 11k of the housing 11, and the other free end 23a engages with the operation piece part 22d of the operation plate 22 and moves in a direction separating from the one free end 23a against the elastic restoring force of the return spring 23. Therefore, the return spring 23 is deflected, and a return force to the neutral position acts on the operation lever 21.

The fixing member 67 is provided on the side opposite to the bottom surface 11a of the housing 11 in the direction of the rotation axis. The fixing member 67 is a substantially plate-like member. The fixing member 67 is rotatable relative to the output shaft member 30. A cylindrical part 67a extending to the output side in the axial direction is provided in the central part of the fixing member 67. An inner peripheral surface of the cylindrical part 67a of the fixing member 67 provided coaxially with the rotation shaft of the output shaft member 30 rotatably supports the large-diameter columnar part 32 of the output shaft member 30 via a cylindrical part 13b of the metal bush 13.

The fixing member 67 is provided with three fixing bolt insertion holes 67b at its outer edge part. A bolt (not illustrated) inserted into the fixing bolt insertion hole 67b and the fixing bolt insertion hole 11d of the housing 11 is screwed into a screw hole of the seat frame 40c, whereby the fixing member 67 is fixed to the seat frame 40c together with the housing 11.

<Input-Side Clutch>

The input-side clutch 50 includes the input-side inner ring member 51, the input-side outer ring member 52, a locking member 53, the operation bracket 54 (one example of operation member), an input-side clutch roller 55 (one example of input-side transmission member), and an input-side roller biasing spring 56.

Figure 3:
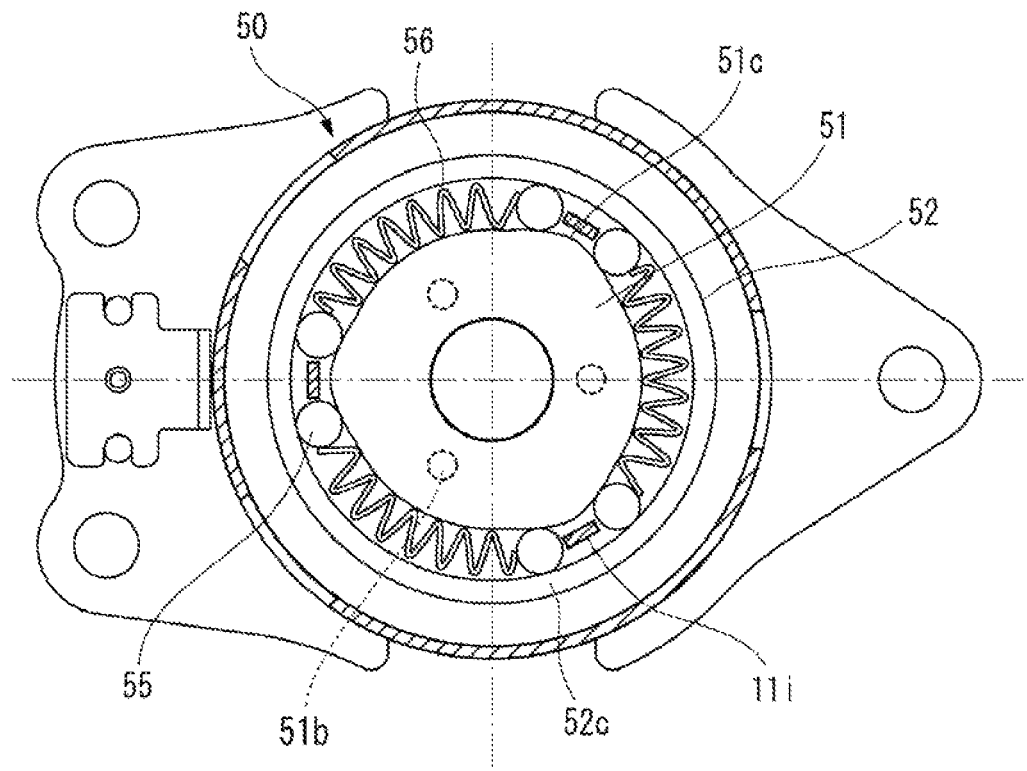
FIG. 3 is a diagram illustrating an input-side clutch in a neutral state.

The input-side inner ring member 51 is a member having a thickness in the rotation axis direction. The input-side inner ring member 51 has an insertion hole 51a through which the small-diameter columnar part 34 of the output shaft member 30 is inserted at the center. Three wedge cam parts 51c bulging outward are provided at equal intervals on the outer peripheral edge of the input-side inner ring member 51. Three protrusions 51b illustrated in FIG. 3 are formed on an input-side surface of the input-side inner ring member 51.

The operation bracket 54 is a plate-shaped member. The operation bracket 54 has an insertion hole 54a through which the small-diameter columnar part 34 of the output shaft member 30 is inserted at the center in the radial direction. In addition, the operation bracket 54 has three fitting holes 54b into which the protrusions 51b of the input-side inner ring member 51 are fitted. Due to the fitting structure of the protrusion 51b of the input-side inner ring member 51 and the fitting hole 54b, the input-side inner ring member 51 and the operation bracket 54, which are separate members, are connected so as to rotate integrally with each other and to be movable relative to each other in the rotation axis direction.

Three claw parts 54c are provided on the outer peripheral edge of the operation bracket 54. These claw parts 54c pass through the window parts 11h formed in the bottom surface 11a of the housing 11, are fitted into the engagement holes 22b of the operation plate 22, and have their tip ends riveted. As a result, the operation bracket 54 is connected to the operation plate 22 and rotates integrally with the operation plate 22.

The locking member 53 is provided between the input-side outer ring member 52 and the operation bracket 54 in the direction of the rotation axis. The locking member 53 can be formed of an annular wave washer or the like. The inner diameter of the locking member 53 is larger than the outer diameter of the input-side inner ring member 51, and the locking member 53 does not apply an axial force to the input-side inner ring member 51. The locking member 53 biases the input-side outer ring member 52 and the operation bracket 54 in directions in which the parts are separated from each other. The locking member 53 presses the input-side outer ring member 52 toward the output side in the axial direction, and presses the operation bracket 54 toward the input side in the axial direction. The locking member 53 makes it easy to maintain the input-side outer ring member 52 in its position independently of the rotational movement of the operation bracket 54.

The input-side outer ring member 52 is a plate-shaped member. The input-side outer ring member 52 includes a bottom part 52b, an outer ring part 52c, and a fixing part 52d. The bottom part 52b is a disk-shaped part. An insertion hole 52a through which the small-diameter columnar part 34 of the output shaft member 30 is inserted is provided at the center of the bottom part 52b in the radial direction. The outer ring part 52c is a cylindrical part extending from the outer edge part of the bottom part 52b to the input side. The bottom part 52b is provided at an output-side end part of the outer ring part 52c. The fixing part 52d is a protrusion protruding from the bottom part 52b toward the output side. The fixing part 52d is coupled to a release bracket 64 of the output-side clutch 60 described later.

FIG. 3 illustrates the input-side clutch 50 in the neutral state.

As illustrated in FIG. 3, a gap is provided between an inner peripheral surface of the input-side outer ring member 52 and an outer peripheral surface of the input-side inner ring member 51. The inner peripheral surface of the input-side outer ring member 52 is a circumferential surface, while the outer peripheral surface of the input-side inner ring member 51 is provided with the three wedge cam parts 51c that bulge outward. Therefore, in the gap between the inner peripheral surface of the input-side outer ring member 52 and the outer peripheral surface of the input-side inner ring member 51, a part in which both ends in the radial direction are tapered in a wedge-like shape is formed. The protruding piece 11i of the housing 11 protrudes in this gap. When the input-side inner ring member 51 is rotated by the operation lever 21, the protruding piece 11i restricts the movement of some of the input-side clutch rollers 55.

The input-side clutch 50 includes six input-side clutch rollers 55 and three input-side roller biasing springs 56. The input-side clutch roller 55 and the input-side roller biasing spring 56 are disposed between the outer peripheral surface of the input-side inner ring member 51 and the inner peripheral surface of the outer ring part 52c of the input-side outer ring member 52.

The input-side roller biasing spring 56 is disposed between the wedge cam parts 51c of the input-side inner ring member 51 in the circumferential direction. In addition, a pair of the input-side clutch rollers 55 are disposed on both sides of the wedge cam part 51c of the input-side inner ring member 51. The protruding piece 11i of the housing 11 is disposed between the pair of input-side clutch rollers 55. That is, in the gap between the input-side inner ring member 51 and the input-side outer ring member 52, the input-side roller biasing spring 56, the input-side clutch roller 55, the protruding piece 11i, and the input-side clutch roller 55 are provided in this order in the counterclockwise direction.

<Operation of Input-Side Clutch>

As illustrated in FIG. 3, in the neutral state, in the input-side clutch 50, the input-side clutch roller 55 is in contact with the input-side roller biasing spring 56, and the input-side clutch roller 55 is biased toward the top of the wedge cam part 51c by the input-side roller biasing spring 56. Therefore, in the neutral state, the input-side clutch roller 55 digs into the input-side inner ring member 51 and the input-side outer ring member 52.

In this neutral state, for example, when the operator starts to rotate the operation lever 21 counterclockwise from the neutral position (position of operation lever 21 with no load) of the operation lever 21, the rotation of the operation lever 21 is transmitted to the input-side inner ring member 51 via the operation plate 22 and the operation bracket 54. That is, the input-side inner ring member 51 starts to rotate counterclockwise together with the operation lever 21.

The input-side clutch roller 55 is provided in a wedge-shaped space narrowed in the clockwise direction between the input-side inner ring member 51 and the input-side outer ring member 52. When the input-side inner ring member 51 starts to rotate counterclockwise, the inner peripheral surface of the input-side inner ring member 51 applies a force that causes the input-side clutch roller 55 to dig into the wedge-shaped space narrowed in the clockwise direction. When receiving such a force, the input-side clutch roller 55 applies, on the inner peripheral surface of the outer ring part 52c of the input-side outer ring member 52, a force including a component pressing outward in the radial direction and a component pressing in the counterclockwise direction. The Input-side clutch roller 55 applies a force to rotate counterclockwise to the input-side outer ring member 52. In this way, when the input-side inner ring member 51 rotates counterclockwise, the input-side outer ring member 52 rotates counterclockwise together with the input-side clutch roller 55.

<Output-Side Clutch>

Returning to FIG. 2, the output-side clutch 60 includes the output-side inner ring member 61, an output-side outer ring member 62, the release bracket 64, an output-side clutch roller 65, and an output-side roller biasing spring 66.

The output-side outer ring member 62 is a substantially cylindrical member. The output-side outer ring member 62 is provided coaxially with the output shaft member 30 and is rotatable relative to the output-side inner ring member 61. The output-side outer ring member 62 is disposed on the outer peripheral side of the output-side inner ring member 61.

The output-side inner ring member 61 is provided coaxially with the output shaft member 30 and rotates integrally with the output shaft member 30. The output-side inner ring member 61 is a member smaller than the inner diameter of the output-side outer ring member 62.

A plurality of grooves are provided on an inner peripheral surface of the output-side inner ring member 61 to form a spline part 61a to which the spline part 33 of the output shaft member 30 is coupled. Six protrusions 61b are formed on an input-side surface of the output-side inner ring member 61 (see FIG. 4). Note that in FIG. 2, recesses, which are traces when the protrusions 61b are formed by press working, are seen on the output-side surface of the output-side inner ring member 61. Six wedge cam parts 61c bulging outward are formed at equal intervals on an outer peripheral part of the output-side inner ring member 61.

The release bracket 64 is a substantially disk-shaped member, and is disposed on the input side of the output-side inner ring member 61. The release bracket 64 can transmit a force applied from the input-side clutch 50 to the output-side clutch roller 65. The outer diameter of the release bracket 64 is formed to be larger than the outer diameter of the output-side inner ring member 61 and smaller than the inner diameter of the output-side outer ring member 62. The release bracket 64 is a member separate from the output-side inner ring member 61, the output-side outer ring member 62, the input-side inner ring member 51, and the input-side outer ring member 52.

A plurality of first engagement holes 64a are formed in the release bracket 64. The fixing part 52d of the input-side outer ring member 52 is inserted into the first engagement hole 64a. As a result, the release bracket 64 is rotatable together with the input-side outer ring member 52. In addition, when the input-side outer ring member 52 is pressed against the release bracket 64 by the locking member 53, frictional force to prevent relative rotation between the input-side outer ring member 52 and the release bracket 64 is generated. Furthermore, when the release bracket 64 is pressed against the output-side inner ring member 61 by the locking member 53, frictional force to prevent relative rotation between the release bracket 64 and the output-side inner ring member 61 is also generated.

The release bracket 64 has a plurality of long holes 64b into which the protrusions 61b (see FIG. 4) protruding toward the input side of the output-side inner ring member 61 are inserted. Each of these long holes 64b is a long hole extending in the circumferential direction. The protrusion 61b can be slightly displaced in the circumferential direction in the long hole 64b. That is, the release bracket 64 and the output-side inner ring member 61 are rotatable relative to each other within the range in which the protrusion 61b is displaced in the long hole 64b.

Six claw parts 64c extending toward the output side are provided on the outer peripheral edge of the release bracket 64. The claw part 64c is provided between a pair of output-side clutch rollers 65.

Figure 4:
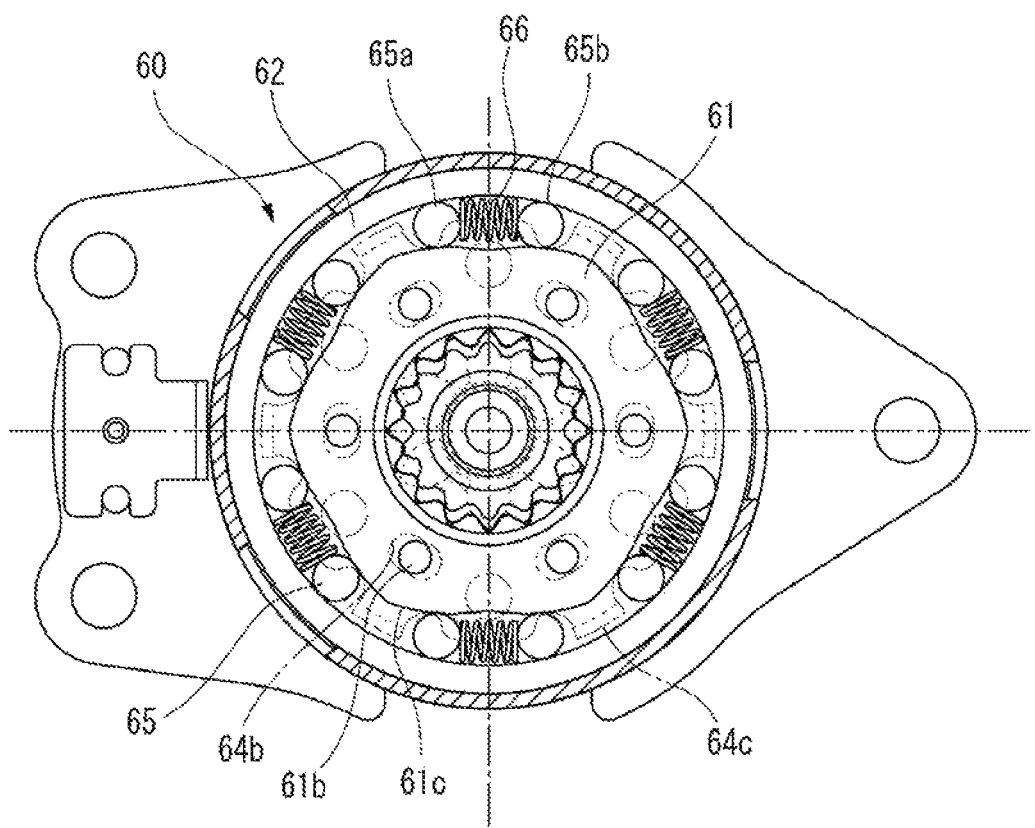
FIG. 4 is a diagram illustrating an output-side clutch in a neutral state.

FIG. 4 illustrates the output-side clutch 60 in the neutral state. As illustrated in FIG. 4, a gap is provided between an inner peripheral surface of the output-side outer ring member 62 and an outer peripheral surface of the output-side inner ring member 61. The inner peripheral surface of the output-side outer ring member 62 is a circumferential surface, while the wedge cam part 61c bulging outward is provided on the outer peripheral surface of the output-side inner ring member 61. Therefore, in the gap between the inner peripheral surface of the output-side outer ring member 62 and the outer peripheral surface of the output-side inner ring member 61, a part in which both ends in the radial direction are tapered in a wedge-like shape is formed. The claw part 64c of the release bracket 64 protrudes in a gap between these parts. When the release bracket 64 is rotated, the claw part 64c moves inside the gap.

The output-side clutch 60 includes 12 output-side clutch rollers 65 and six output-side roller biasing springs 66. The output-side clutch roller 65 and the output-side roller biasing spring 66 are disposed in the gap between the outer peripheral surface of the output-side inner ring member 61 and the inner peripheral surface of the output-side outer ring member 62. The output-side clutch roller 65 is a member that is disposed between the outer peripheral surface of the output-side inner ring member 61 and the inner peripheral surface of the output-side outer ring member 62 and capable of transmitting the rotational force between the output-side inner ring member 61 and the output-side outer ring member 62. The output-side clutch roller 65 is provided so as to abut on the claw part 64c of the release bracket 64.

The output-side roller biasing spring 66 is disposed between the wedge cam parts 61c of the output-side inner ring member 61 in the radial direction. In addition, a pair of the output-side clutch rollers 65 are disposed on both sides of the wedge cam part 61c of the output-side inner ring member 61. The claw part 64c of the release bracket 64 is disposed between the pair of output-side clutch rollers 65. These output-side clutch rollers 65 are biased toward the top of the wedge cam part 61c by the output-side roller biasing springs 66. In the gap between the output-side inner ring member 61 and the output-side outer ring member 62, the claw part 64c, the output-side clutch roller 65, the output-side roller biasing spring 66, and the output-side clutch roller 65 are provided in this order in the counterclockwise direction.

<Operation of Output-Side Clutch>

FIG. 4 illustrates the output-side clutch 60 in the neutral state. As illustrated in FIG. 4, in the neutral state, in the output-side clutch 60, the output-side clutch roller 65 is biased toward the top of the wedge cam part 61c by the output-side roller biasing spring 66. As a result, the output-side clutch roller 65 digs into the wedge-shaped gap between the wedge cam part 61c of the output-side inner ring member 61 and the inner peripheral surface of the output-side outer ring member 62.

More specifically, the description will be given using a first output-side clutch roller 65a, and a second output-side clutch roller 65b located on the clock side of the first output-side clutch roller 65a via the output-side roller biasing spring 66.

The gap in which the first output-side clutch roller 65a is located has a wedge shape tapered in the counterclockwise direction. The first output-side clutch roller 65a is biased in the counterclockwise direction by the output-side roller biasing spring 66. Therefore, the first output-side clutch roller 65a digs into the output-side inner ring member 61 and the output-side outer ring member 62 in the counterclockwise direction.

The gap in which the second output-side clutch roller 65b is located has a wedge shape tapered in the clockwise direction. The second output-side clutch roller 65b is biased in the clockwise direction by the output-side roller biasing spring 66. Therefore, the second output-side clutch roller 65b digs into the output-side inner ring member 61 and the output-side outer ring member 62 in the clockwise direction.

Here, the output-side outer ring member 62 is not movable with respect to the housing 11. In addition, the first output-side clutch roller 65a and the second output-side clutch roller 65b dig into both the output-side inner ring member 61 and the output-side outer ring member 62 in the counterclockwise direction and the clockwise direction. Therefore, the output-side inner ring member 61 and the output-side outer ring member 62 cannot rotate. As a result, the output shaft member 30 spline-coupled to the output-side inner ring member 61 cannot rotate either.

As described above, in the neutral state, since the output-side inner ring member 61 and the output-side outer ring member 62 are in a non-rotatable state, the output shaft member 30 does not rotate even when a rotational force is applied to the output shaft member 30 from the vehicle seat 40 side. As a result, the vehicle seat 40 is fixed with its height maintained.

Next, a case where the output-side clutch 60 rotates the output shaft member 30 will be described.

When the operation lever 21 is rotated counterclockwise, the input-side outer ring member 52 of the input-side clutch 50 rotates counterclockwise as described above. The input-side outer ring member 52 is rotatable together with the release bracket 64 when the fixing part 52d is inserted into the first engagement hole 64a. Therefore, when the operation lever 21 is rotated counterclockwise, the release bracket 64 also rotates counterclockwise.

The release bracket 64 is coupled to the protrusion 61b of the output-side inner ring member 61 via the long hole 64b. Therefore, the release bracket 64 (1) first rotates counterclockwise in a state where the output-side inner ring member 61 does not rotate, and (2) rotates counterclockwise together with the output-side inner ring member 61 after the protrusion 61b abuts on the edge of the long hole 64b.

(1) When the release bracket 64 rotates counterclockwise in a state where the output-side inner ring member 61 does not rotate, the claw part 64c of the release bracket 64 pushes the output-side clutch roller 65 counterclockwise. Then, the abutment state of the output-side clutch roller 65, which had dug into the wedge-shaped space narrowed in the clockwise direction between the output-side inner ring member 61 and the output-side outer ring member 62, with the output-side inner ring member 61 and the output-side outer ring member 62 is released.

Further, when the output-side inner ring member 61 starts to rotate counterclockwise, the frictional force between the output-side inner ring member 61 and the output-side clutch roller 65 that had dug into the wedge-shaped space narrowed in the counterclockwise direction between the output-side inner ring member 61 and the output-side outer ring member 62 is cancelled, and the abutment state between the output-side clutch roller 65 and the output-side inner ring member 61 is released.

As described above, in a state where the abutment state of the output-side clutch roller 65 with the output-side inner ring member 61 and the output-side outer ring member 62 is released, the output-side inner ring member 61 becomes relatively rotatable with respect to the output-side outer ring member 62.

After the output-side inner ring member 61 is relatively rotatable with respect to the output-side outer ring member 62, (2) the protrusion 61b of the output-side inner ring member 61 abuts on the edge of the long hole 64b of the release bracket 64. Then, the output-side inner ring member 61 rotates counterclockwise together with the release bracket 64.

As described above, the output-side clutch 60 is configured not to rotate the output shaft member 30 in the neutral state where no operation force acts on the operation lever 21, but to rotate the output shaft member 30 only in a state where an operation force acts on the operation lever 21.

<Input-Side Outer Ring Member>

Figure 5:
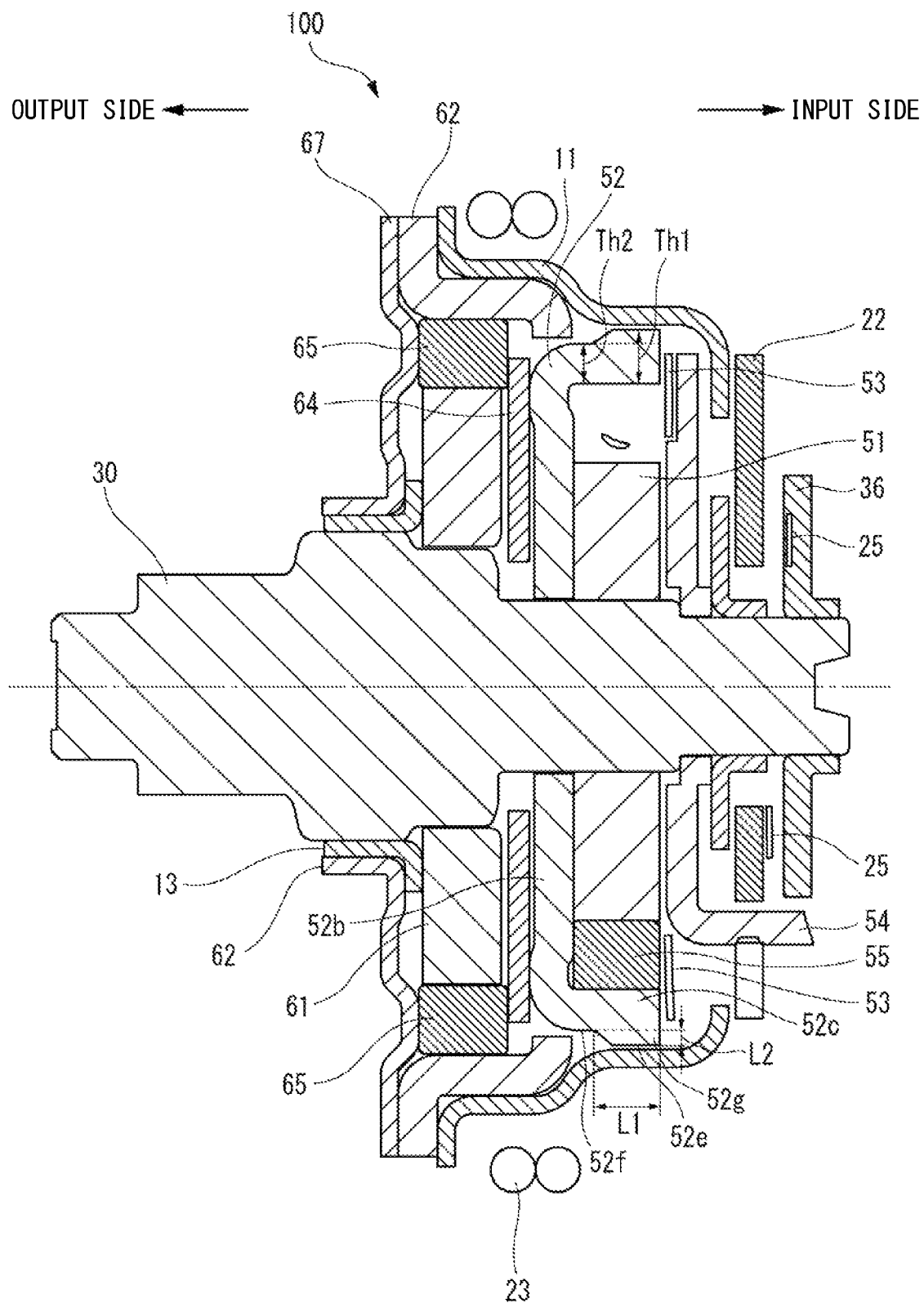
FIG. 5 is a cross-sectional view along an axial direction of the clutch unit.

Here, the input-side outer ring member 52 according to the present embodiment will be described with reference to FIG. 5. FIG. 5 is a cross-sectional view along the axial direction of the clutch unit 100. As illustrated in FIG. 5, the input-side outer ring member 52 is a member having the disk-shaped bottom part 52*b* and the outer ring part 52*c* extending from an outer edge part of the bottom part 52*b* to the input side in the rotation axis direction. A part of the outer ring part 52*c* is a thick part 52*e* projecting outward in the radial direction of the input-side outer ring member 52. The thick part 52*e* is provided at an input-side end (tip) of the outer ring part 52*c*. The thick part 52*e* is provided over the entire outer ring part 52*c* in the circumferential direction.

A part of the outer ring part 52*c* is a non-thick part 52*f* that does not project outward in the radial direction. The non-thick part 52*f* is a part of the outer ring part 52*c* other than the thick part 52*e*. An inner peripheral surface of the thick part 52*e* is flush with an inner peripheral surface of the non-thick part 52*f*. A thickness Th1 of the thick part 52*e* in the radial direction is larger than a thickness Th2 of the non-thick part 52*f* in the radial direction. A part of the thick part 52*e* connected to the non-thick part 52*f* is configured such that the outward projection of the thick part 52*e* in the radial direction decreases toward the non-thick part 52*f*. The outer ring part 52*c* has a projecting part 52*g* that is a part of the thick part 52*e* projecting outward in the radial direction from the non-thick part 52*f*. In the projecting part 52*g*, a length L1 of the projecting part 52*g* extending in the rotation axis direction is longer than a length L2 of the projecting part 52*g* projecting in the radial direction.

Here, when the operation handle is operated, the input-side inner ring member rotates in the input-side clutch, and the rotational force is transmitted to the input-side outer ring member via the input-side transmission member. On the other hand, in a state where the vehicle seat is fully raised (uppermost) or fully lowered (downmost), an operation of raising or lowering the vehicle seat of the output-side clutch is locked (rotation of output shaft member 30, output-side inner ring member 61, and release bracket 64 is restricted). When the operation handle is operated in the rotation direction in which the output-side clutch is locked, the rotational force is transmitted to the input-side outer ring member via the input-side transmission member, but since the output-side clutch is locked, the rotation of the input-side outer ring member is also locked, and an excessive load is applied from the input-side transmission member to the input-side outer ring member. As a result, there is a possibility that the input-side outer ring member will be deformed. In particular, when the number of input-side transmission members is reduced, the load applied to the input-side outer ring member by each input transmission member can be further increased.

The clutch unit according to the present embodiment includes the input-side outer ring member 52 having the disk-shaped bottom part 52*b* and an outer ring part 52*c* extending in the rotation axis direction from an outer edge part of the bottom part 52*b*. A part of the outer ring part 52*c* is a thick part 52*e* projecting outward in the radial direction of the input-side outer ring member 52. The thickness Th1 of the thick part 52*e* in the radial direction is larger than the thickness Th2 of the non-thick part 52*f* in the radial direction, the non-thick part 52*f* being a part of the outer ring part 52*c* other than the thick part 52*e*. With this configuration, the radial strength of the input-side outer ring member 52 can be enhanced, and deformation of the input-side outer ring member 52 can be curbed even when the operation handle is operated in the locked rotation direction in a state where the output-side clutch 60 is locked at the uppermost or downmost position. Furthermore, even in a case where the number of the input-side clutch rollers 55 (one example of input-side transmission member) is six, it is possible to curb deformation due to the load applied from each of the input-side clutch rollers 55 and form the clutch unit with a small number of components.

In addition, since the thick part 52*e* is provided at the tip end part of the outer ring part 52*c*, the strength against a radial force received by the outer ring part 52*c* can be effectively enhanced. In addition, since the thick part 52*e* is provided over the entire outer ring part 52*c* in the circumferential direction, the strength can be secured even when positions of the input-side clutch roller 55 and the corresponding thick part 52*e* of the input-side outer ring member 52 are shifted in the state where the output-side clutch 60 is locked. In addition, since the length of the thick part 52*e* extending in the rotation axis direction (length L1 of projecting part 52*g* extending in rotation axis direction) is longer than the length of the thick part 52*e* projecting outward in the radial direction from the non-thick part 52*f* (length L2 of projecting part 52*g* projecting in radial direction), it is possible to enhance the strength while preventing upsizing of the input-side outer ring member 52 as compared with the case where the thick part 52*e* projects largely in the radial direction than in the rotation axis direction. In addition, since the part of the thick part 52*e* connected to the non-thick part 52*f* is configured such that the outward projection of the thick part 52*e* in the radial direction decreases toward the non-thick part 52*f*, stress concentration on the connecting part can be curbed. Note that while the connecting part in FIG. 5 is inclined, the connecting part may have a round shape.

Note that the present invention is not limited to the above-described embodiment, and can be freely modified, improved, and the like as appropriate. In addition, the material, shape, dimension, numerical value, form, number, arrangement place, and the like of each component in the above-described embodiment are arbitrary and are not limited as long as the present invention can be achieved.

The present application is based on Japanese Patent Application (Japanese Patent Application No. 2020-82175) filed on May 7, 2020, which is incorporated herein by reference in its entirety. Also, all references cited herein are incorporated in their entirety.

REFERENCE SIGNS LIST

11 Housing
11*a* Bottom surface
21 Operation lever
22 Operation plate
23 Return spring
30 Output shaft member
31 Pinion gear
32 Large-diameter columnar part
33 Spline part
34 Small-diameter columnar part
36 Stopper ring
40 Vehicle seat
40*a* Seat
40*c* Seat frame
41 Vehicle seat lifter
50 Input-side clutch
51 Input-side inner ring member
52 Input-side outer ring member
52*b* Bottom part
52*c* Outer ring part
52*e* Thick part
52*f* Non-thick part
52*g* Projecting part
53 Locking member 54 Operation bracket (operation member)
55 Input-side clutch roller (input-side transmission member)
56 Input-side roller biasing spring
60) Output-side clutch
61 Output-side inner ring member
62 Output-side outer ring member
64 Release bracket
65 Output-side clutch roller
66 Output-side roller biasing spring
100 Clutch unit

The invention claimed is:

1. A clutch unit used for a vehicle seat, the clutch unit comprising:
   an operation lever that is rotatable about a rotation axis;
   an operation member that rotates integrally with the operation lever about the rotation axis;
   an output shaft member that is rotatable about the rotation axis and outputs an operation force input to the operation lever to the vehicle seat;
   an input-side clutch including an input-side inner ring member and an input-side outer ring member into which the output shaft member is inserted, and an input-side transmission member disposed in a wedge-shaped space formed between an outer peripheral surface of the input-side inner ring member and an inner peripheral surface of the input-side outer ring member;
   an output-side clutch that transmits rotational torque of the input-side clutch to the output shaft member and curbs transmission of rotational torque from the output shaft member to the input-side clutch; and
   a housing that accommodates the input-side clutch, wherein:
   the input-side outer ring member is a member including a disk-shaped bottom part and an outer ring part extending in a rotation axis direction from an outer edge part of the bottom part;
   a part of the outer ring part of the input-side outer ring member is a thick part projecting outward in a radial direction of the input-side outer ring member; and
   a thickness of the thick part in the radial direction is larger than a thickness of a non-thick part in the radial direction, the non-thick part being a part of the outer ring part other than the thick part.

2. The clutch unit according to claim 1, wherein
the thick part is provided in a tip end part of the outer ring part.

3. The clutch unit according to claim 2, wherein
the thick part is provided over the entire outer ring part in a circumferential direction.

4. The clutch unit according to claim 2, wherein
a length of the thick part extending in the rotation axis direction is longer than a length of the thick part projecting outward in the radial direction from the non-thick part.

5. The clutch unit according to claim 2, wherein
a part of the thick part connected to the non-thick part is configured such that outward projection of the thick part in the radial direction decreases as getting closer to the non-thick part.

6. The clutch unit according to claim 1, wherein
the thick part is provided over the entire outer ring part in a circumferential direction.

7. The clutch unit according to claim 6, wherein
a length of the thick part extending in the rotation axis direction is longer than a length of the thick part projecting outward in the radial direction from the non-thick part.

8. The clutch unit according to claim 6, wherein
a part of the thick part connected to the non-thick part is configured such that outward projection of the thick part in the radial direction decreases as getting closer to the non-thick part.

9. The clutch unit according to claim 1, wherein
a length of the thick part extending in the rotation axis direction is longer than a length of the thick part projecting outward in the radial direction from the non-thick part.

10. The clutch unit according to claim 9, wherein
a part of the thick part connected to the non-thick part is configured such that outward projection of the thick part in the radial direction decreases as getting closer to the non-thick part.

11. The clutch unit according to claim 1, wherein
a part of the thick part connected to the non-thick part is configured such that outward projection of the thick part in the radial direction decreases as getting closer to the non-thick part.

* * * * *